Figure 1:
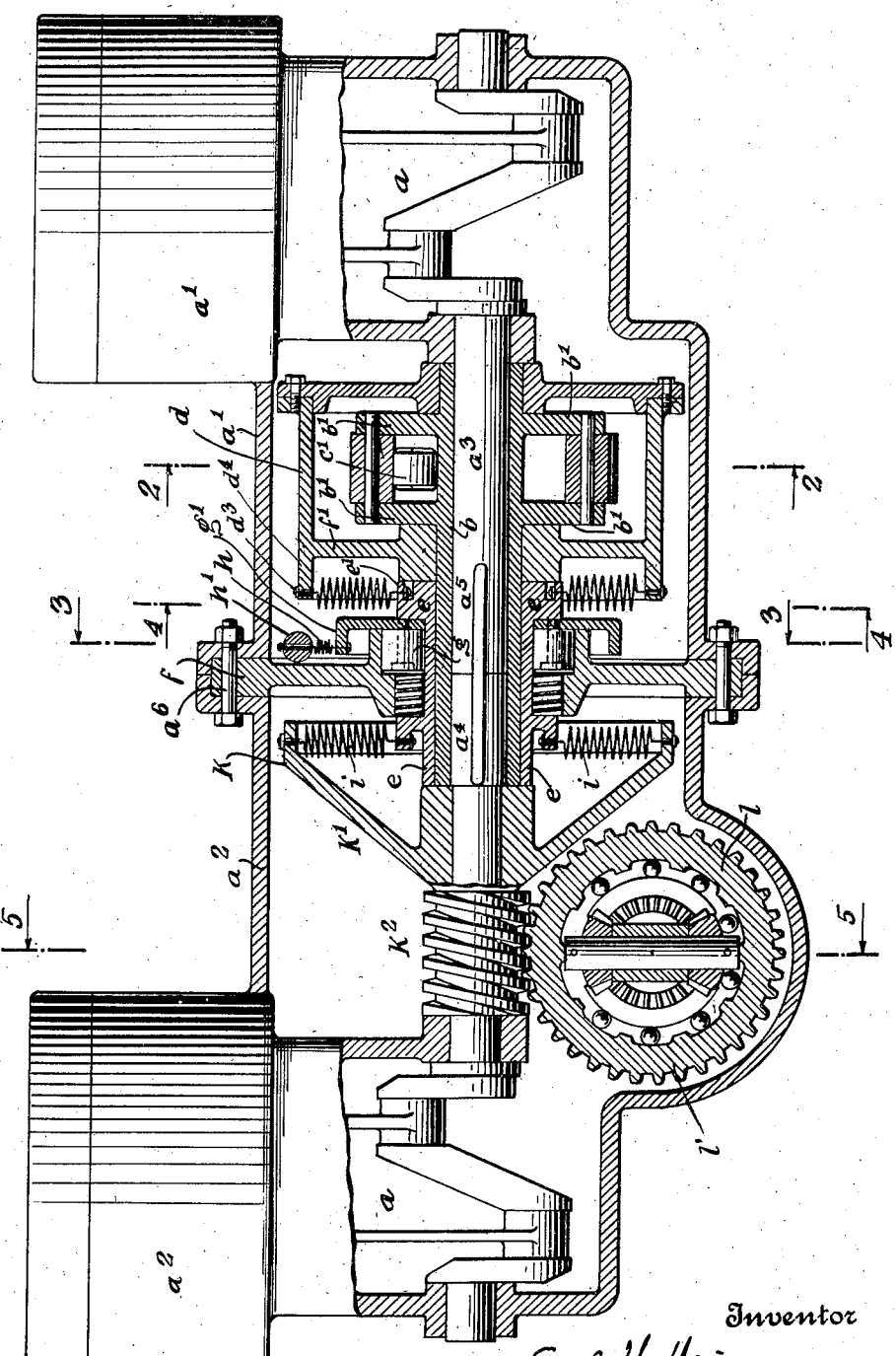

Oct. 27, 1931.  C. W. WEISS  1,828,825
TRANSMISSION DEVICE
Filed March 27, 1930  3 Sheets-Sheet 1

Inventor
Carl W. Weiss
By his Attorneys
Redding, Greeley, O'Shea & Campbell

Oct. 27, 1931.  C. W. WEISS  1,828,825
TRANSMISSION DEVICE
Filed March 27, 1930  3 Sheets-Sheet 2
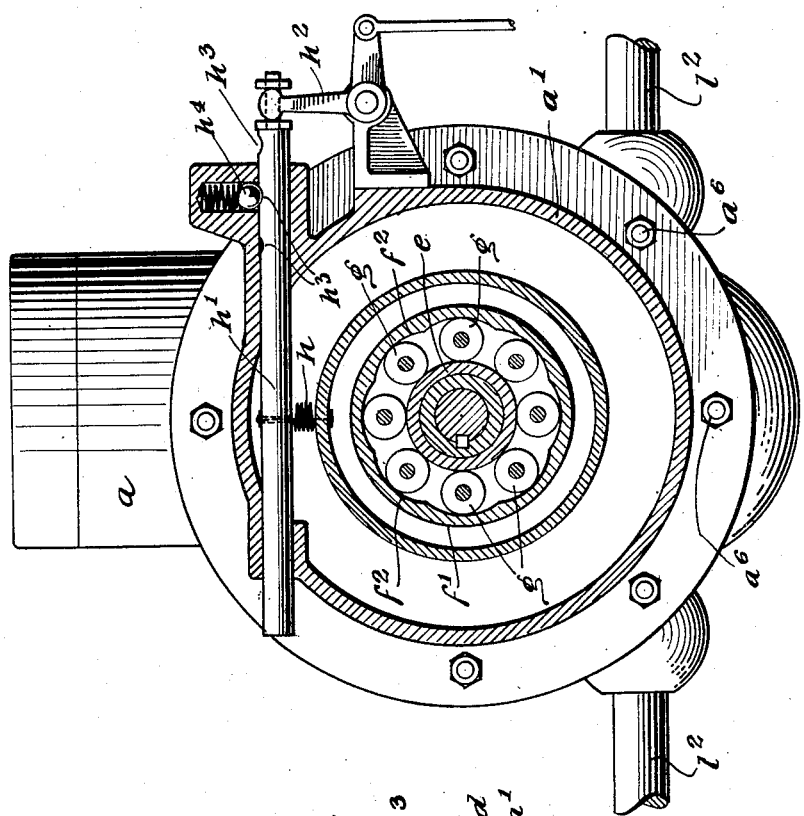
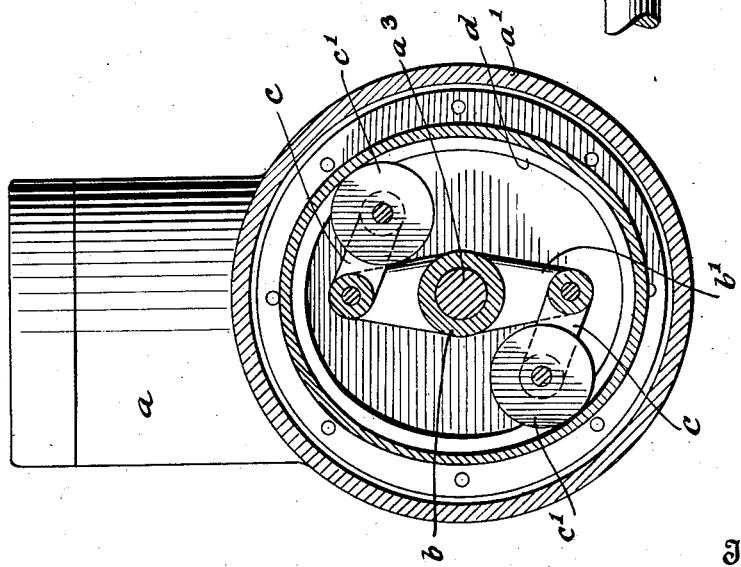
Inventor
Carl W. Weiss
By his Attorneys
Redding, Greeley, O'Shea & Campbell

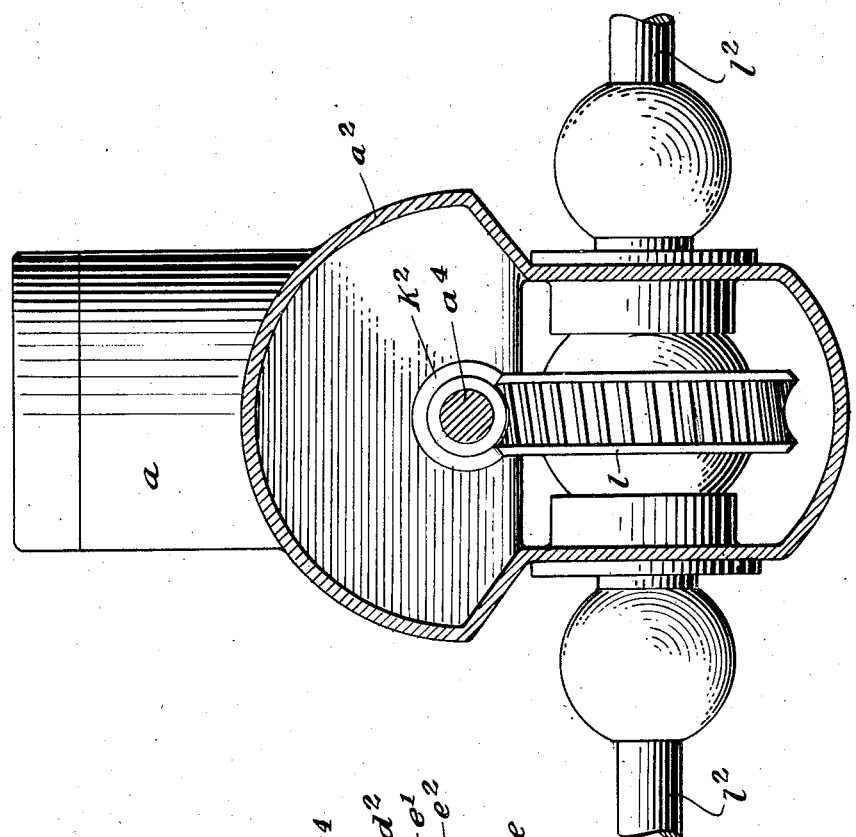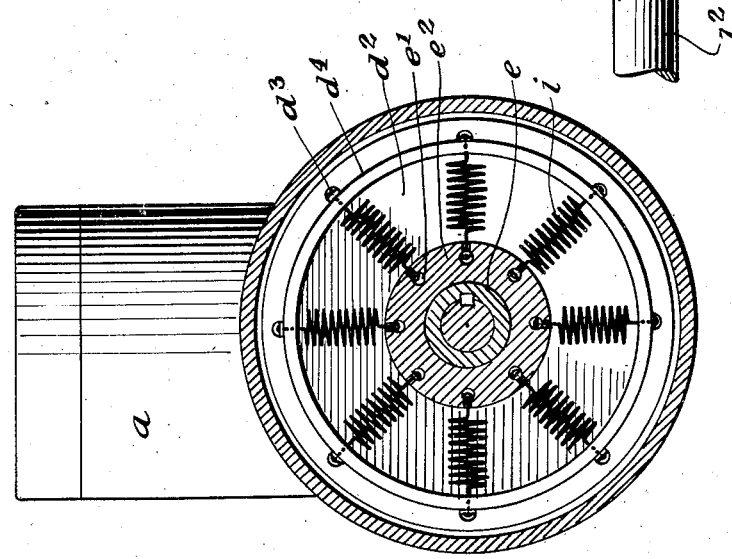

Patented Oct. 27, 1931

1,828,825

UNITED STATES PATENT OFFICE

CARL W. WEISS, OF BROOKLYN, NEW YORK

TRANSMISSION DEVICE

Application filed March 27, 1930. Serial No. 439,296.

This invention relates to torque controlled transmission devices, designed to be automatically responsive to variations in torque or resistance. The invention has been developed with particular reference to the application of devices of this character to automotive vehicles, so that the vehicle can be driven by the throttle alone, the speed ratio being increased automatically as resistance to the movement of the vehicle increases, as in ascending a grade. Such devices, however, are capable of application to other specific uses and it will be understood that the invention is not limited with respect to any particular application. The invention is particularly concerned with transmission devices in which the motive power is applied to a freely rotatable body upon which is mounted, in such manner to be responsive to centrifugal action, a body which not only revolves with the freely rotatable member, but is free to change its position under the varying influence of centrifugal action at different speeds of rotation of the freely rotatable member. The present invention is involved primarly in the means through which power is transmitted from such revolving centrifugal body to the part, or element, or member, of the transmission which is to be driven and from which power is in turn transmitted through mechanism of suitable character to, for example, the wheels of a vehicle. In the embodiment of the invention illustrated the centrifugal body, or each of the centrifugal bodies, coacts directly with the internal elliptical surface of a drum-like member with which the centrifugal body contacts and to which is thus imparted a movement of oscillation, first in one direction, as the centrifugal body passes, through one quadrant, from one end of the minor axis of the ellipse to one end of the major axis, then in the opposite direction, as the centrifugal body passes, in the second quadrant, from one end of the major axis to the other end of the minor axis, then again in the first direction, as the centrifugal body passes through the third quadrant, and finally in the second or opposite direction, as the centrifugal body passes through the fourth quadrant. Through spring connections, preferably arranged radially, the oscillation of the drum in the first direction produces, through increased tension of the spring connection, movement in the same direction of a rotary intermediate member. The reaction device, acting through a one-way brake, prevents rotation of the intermediate member in the opposite direction during the movement of the centrifugal body through the second quadrant, but the spring connection is placed under increased tension or, in other words, has power stored up in it, and such stored energy is applied to the intermediate body to move it in the same or forward direction, being added to the action of the spring connection as the centrifugal body moves through the third quadrant. In like manner energy is stored in the spring connection during the movement of the centrifugal body through the fourth quadrant and is applied to the intermediate body as the centrifugal body moves through the first quadrant. Provision is made whereby the one-way brake may act in either direction, so that the successive movements of the intermediate body shall be always in one direction or in the other at the will of the operator. The intermediate body, as will be understood, has imparted to it by the means referred to, an intermitting movement in one direction or the other. Such intermitting movement is converted into continuous movement of the driven member of the transmission through a similar spring connection, energy which is stored in the spring connection by the forward movement of the intermediate body being applied to the driven member during each interval of rest of the intermediate member, with the result that the driven member receives a continuous motion of rotation. It may be said, by way of explanation, that when the oscillating drum-like contact member moves in a forward direction it places the spring connection under tension and so pulls the intermediate member with it, and that when the oscillating member moves in the opposite or rearward direction it tenses the spring connection against the action of the reaction device, so that energy is stored in the spring connection and in the next forward oscillation is returned to the oscillating member and is so applied to the intermediate member. In this manner no energy is lost, save that a negligible amount which develops heat.

The two spring connections, that is the spring connection between the elliptical contact member and the intermediate member and the spring connection between the intermediate member and the driven member, coact in such manner that the forward or positive impulses imparted to the intermediate member through the first mentioned spring connection, impart rotary angular movement to the intermediate member within the capacity of the second spring connection between the intermediate member and the driven member, while the backward or negative impulses are stored in the spring connection to be given back to the oscillating member and added to the positive impulses given to it by the centrifugal body. The tension on the spring connections in the direction of forward rotation is thus doubled and is transmitted to the driven member. It will be observed that for every revolution of the centrifugal body there are two positive or forward, and two negative or backward, impulses but that inasmuch as the positive impulses are productive of torque at the driven member there are produced for each revolution only two driving efforts which are converted to constant torque, the mean value of which depends on the impulse frequency (which = R. P. M. × 2) and the angular movement from zero to maximum spring tension, so long as the speed ratio between the motor and the transmission drum is below 1:1 or direct drive.

It will be understood that the ratio of the major and minor axes of the ellipse of the oscillating contact member or drum is such that each centrifugal body is in constant contact with the inner surface of the drum at all speeds, the centrifugal force being greater than the force of inertia due to the radial movement of the centrifugal bodies while they revolve about the axis of revolution.

Reference has been made above to the fact that for every rotation of the motor shaft there are two positive and two negative impulses and it will follow necessarily that in each revolution of the centrifugal bodies there are two neutral positions, one when the centrifugal bodies are alined with the major axis of the drum and one when they are alined with the minor axis.

It will be observed that as there is no manually operated clutch or gear shift the motor speed can be increased instantly to the desired maximum and that the tractive force required for acceleration of the vehicle is available in a very brief time. Furthermore, as the centrifugal force increases directly as the weight of the centrifugal bodies and the square of the R. P. M., high speed motors can develop very high speed with relatively light weight centrifugal bodies. In the embodiment of the invention illustrated, in which the driven member is shown as a worm in mesh with the worm gear of an ordinary differential, the ratio of the worm and worm gear may be kept below that of the conventional 3-speed transmission, thereby permitting the attainment of so called overspeed when the speed ratio of the motor and the driven member is 1:1. Such 1:1 ratio is established as soon as the resistance to the forward movement of the vehicle drops to such a point that the centrifugal force of the centrifugal bodies, maintaining their position on the major axis of the ellipse of the drum, establishes synchronous rotation of the drum and the centrifugal bodies.

The embodiment of the invention illustrated lends itself in a marked degree to the application of the improved transmission to the driving of front wheel drive automotive vehicles and it is therefore shown as so applied.

In the drawings—

Figure 1 is a view in longitudinal sectional elevation of a mechanism which embodies the invention, the improved transmission being shown as interposed between two motors and as applied to a driven member which is also located between the two motors.

Figures 2, 3, 4 and 5 are detail views in sectional elevation, the planes of section being indicated respectively by the broken lines 2—2, 3—3, 4—4, and 5—5 of Figure 1.

In the embodiment of the invention illustrated there are indicated at $a$, $a$, two motors which may be taken as a source of power although, as will be understood, the power to be transmitted might be supplied by a single motor. Two housings $a^1$ and $a^2$ are shown as furnishing support for the motors, the transmission and the driven member. The two motors are shown as direct connected to shafts $a^3$, $a^4$ which are coupled to form a common shaft by a key $a^5$ and a sleeve $b$.

Mounted on the sleeve $b$, near one end and, it may be, formed integral therewith, is a frame $b^1$ constituting a freely rotatable body and upon the frame are supported, as by means of arms $c$, bodies $c^1$ so that they shall be responsive to centrifugal action. The centrifugal bodies $c^1$ are shown as rollers supported to rotate freely by the arms or links $c$, there being two diametrically opposed rollers to balance each other.

Mounted freely on the sleeve $b$, which in effect constitutes a transmission shaft, and concentric therewith, is a drum-like member $d$ which is interiorly elliptical, forming a track or surface with which the centrifugal bodies $c^1$ make contact and coact. The drum $d$ has no movement of continuous rotation, except when resistance to forward movement of the driven member drops to such a point that the centrifugal force of the centrifugal bodies, maintaining their position at the terminals of the major axis of the ellipse, establishes synchronous rotation of the drum and the centrifugal bodies. Under other conditions, however, the drum, under the influence of the revolving centrifugal bodies, which are pressed by centrifugal force against the drum, has a short movement of oscillation.

The movement of oscillation of the drum $d$ in one direction or the other, but not in both directions, is imparted to a sleeve-like intermediate member $e$ which is mounted loosely on the sleeve shaft $b$ and is supported in a stationary reaction member $f$ which is secured in position by bolts $a^6$ between the two housings $a^1$ and $a^2$. In order that the intermediate member $e$ may be permitted to rotate in one direction or the other, but not in both, and in order that the direction in which it is permitted to rotate may be changed, for the purpose of effecting reversal of the driven member, there is provided between the reaction member $f$ and the intermediate member $e$ a roller clutch or one-way brake which comprises rollers $g$ carried by a diaphragm $g^1$ mounted loosely on the intermediate member $e$ and arranged to cooperate with a flange $f^1$ of the reaction member $f$, internally scalloped, as indicated at $f^2$. It will be understood that if the rollers $g$ are displaced in one direction with respect to the scallops $f^2$ of the flange $f^1$ the intermediate member $e$ will be permitted to rotate in one direction and will be prevented from rotation in the opposite direction, while if the rollers are oppositely displaced with reference to the scallops $f^2$ the intermediate member $e$ will be permitted to rotate in a direction opposite to that first mentioned and held from rotation in the other direction. For the purpose of effecting displacement of the rollers $g$ in one direction or the other, with respect to the scallops $f^2$, the diaphragm or plate $g^1$ is connected, as by a helical spring $h$, with a bar $h^1$ which can be shifted longitudinally in one direction or the other by any suitable means, as indicated at $h^2$ and may be notched, as at $h^3$, for cooperation with a ball detent $h^4$ so that the bar may be held in either of its extreme positions or in a neutral position, the rollers being thereby shifted with respect to the scallops $f^2$ to one or the other of the extreme positions, according to the direction of movement desired, or to the middle or neutral position in which the reaction device will not be effective.

It will be observed that the structure just described, including the reaction member $f$ and the cooperating parts, constitutes a movable, as distinguished from fixed, reaction device which is responsive to variations in torque so that it is possible to multiply torque in order to transmit the horsepower at a lower speed than at the speed of the driving shaft.

Connection is effected between the drum $d$ and the intermediate member $e$ by radially disposed helical springs $d^2$, which are connected at one end, as at $d^3$, to a flange $d^4$ of the drum $d$, and at the other end, as at $e^1$, to a flange $e^2$ of the intermediate member $e$.

In the oscillation of the drum $d$ in one direction the springs $d^2$ are moved at their outer ends away from the radial lines and pull the intermediate member $e$ in the same direction. During the oscillation of the drum $d$ in the opposite direction the intermediate member $e$ is held from movement by the reaction device and the springs, being moved at their outer ends to the opposite side of the radii, are put under tension having stored up in them power which in the next movement of the drum is applied to the intermediate member.

At the other end of the intermediate member $e$ it is similarly connected, through radial springs $i$, with the flange $k$ of the driven member $k^1$ which is herein shown as a conical shell mounted on the shaft $a^4$ and carrying a worm $k^2$ which meshes with a worm gear $l$ of the usual differential gear $l^1$ of a differential $l^2$. The intermediate body or member $e$, as will be understood, has imparted to it an intermitting movement in one direction or the other, and such intermitting movement is converted into continuous movement of the driven member $k^1$ through the spring connection $i$, energy which is stored in the spring connection $i$ by the movement of the intermediate body being applied to the driven member during each interval of rest of the intermediate member with the result that the driven member $k^1$ receives a continuous motion of rotation.

It will be understood that when the resistance to the rotation of the driven member $k^1$ drops to such a point that the centrifugal force of the centrifugal bodies, maintaining their position on the major axis of the ellipse of the drum, establishes synchronous rotation of the drum and the centrifugal bodies, a 1:1 ratio as between the driving member and the driven member, that is, direct drive, will be established.

It will be understood that various changes in details of construction and arrangement can be made to suit different conditions of use and that, except as pointed out in the accompanying claims, the invention is not restricted to the particular construction shown and described herein.

I claim as my invention:

1. A power transmission device comprising a rotatable driving member, a centrifugal body revolving with the driving member, a concentric elliptical contact member with which the centrifugal body coacts, an intermediate member, connections between the contact member and the intermediate member, a driven member, connections between the intermediate member and the driven member, and means to prevent rotation of the intermediate member in one direction while permitting rotation in the opposite direction.

2. A power transmission device comprising a rotatable driving member, a centrifugal body revolving with the driving member, a concentric elliptical contact member with which the centrifugal body coacts, an intermediate member, connections between the contact member and the intermediate member, a driven member, connections between the intermediate member and the driven member, and means to prevent at will rotation of the intermediate member in either direction.

3. A power transmission device comprising a rotatable driving member, a centrifugal body revolving with the driving member, a concentric elliptical contact member with which the centrifugal body coacts, an intermediate member, spring connections between the contact member and the intermediate member, a driven member, spring connections between the intermediate member and the driven member, and means to prevent rotation of the intermediate member in one direction while permitting rotation in the opposite direction.

4. A power transmission device comprising a rotatable driving member, a centrifugal body revolving with the driving member, a concentric elliptical contact member with which the centrifugal body coacts, an intermediate member, connections between the contact member and the intermediate member, a driven member, connections between the intermediate member and the driven member, and a reaction member including a one-way brake in cooperation with the intermediate member.

5. A power transmission device comprising a rotatable driving member, a radially movable centrifugal body revolving with the driving member, a concentric elliptical contact member with which the centrifugal body coacts, an intermediate member, connections between the contact member and the intermediate member, a driven member, connections between the intermediate member and the driven member, and means to prevent rotation of the intermediate member in one direction while permitting rotation in the opposite direction.

6. A power transmission device, comprising a rotatable driving member, a centrifugal body revolving with the driving member, a concentric elliptical contact member with which the centrifugal body coacts, an intermediate member, radially disposed springs connecting the contact member and the intermediate member, a driven member, radially disposed springs connecting the intermediate member and the driven member, and means to prevent rotation of the intermediate member in one direction.

7. A power transmission device comprising a driven member, a rotatable driving member, a centrifugal body revolving with the driving member, a concentric elliptical contact member with which the centrifugal body coacts, a movable reaction device responsive to variations in torque, and means to transmit power from the contact member to the driven member.

8. A power transmission device comprising a driven member, a rotatable driving member, a centrifugal body revolving with the driving member, a concentric elliptical contact member with which the centrifugal body coacts, a movable reaction device responsive to variations in torque, two motors, a common transmission shaft, means to support the torque reaction device between the motors, and means to transmit power from the contact member to the driven member.

This specification signed this 20th day of March A. D. 1930.

CARL W. WEISS.